US008849555B2

(12) United States Patent
Scofield et al.

(10) Patent No.: US 8,849,555 B2
(45) Date of Patent: Sep. 30, 2014

(54) FUEL CONSUMPTION CALCULATIONS AND WARNINGS

(75) Inventors: Christopher L. Scofield, Seattle, WA (US); William J. Schwebel, Seattle, WA (US); Kevin Foreman, Sammamish, WA (US); Kush G. Parikh, Kirkland, WA (US)

(73) Assignee: INRIX, Inc., Kirkland, WA (US)

( * ) Notice: Subject to any disclaimer, the term of this patent is extended or adjusted under 35 U.S.C. 154(b) by 176 days.

(21) Appl. No.: 13/407,828

(22) Filed: Feb. 29, 2012

(65) Prior Publication Data

US 2013/0226443 A1 Aug. 29, 2013

(51) Int. Cl.
*G06F 7/00* (2006.01)

(52) U.S. Cl.
USPC ......... 701/123; 701/533; 701/423; 340/450.2

(58) Field of Classification Search
None
See application file for complete search history.

(56) References Cited

U.S. PATENT DOCUMENTS

| 5,913,917 | A | * | 6/1999 | Murphy | 701/123 |
| 6,591,185 | B1 | | 7/2003 | Polidi et al. | |
| 7,130,743 | B2 | * | 10/2006 | Kudo et al. | 701/424 |
| 7,813,870 | B2 | * | 10/2010 | Downs et al. | 701/117 |
| 7,831,384 | B2 | * | 11/2010 | Bill | 701/423 |
| 2008/0189033 | A1 | | 8/2008 | Geelen et al. | |
| 2009/0109022 | A1 | | 4/2009 | Gangopadhyay et al. | |
| 2009/0157289 | A1 | * | 6/2009 | Graessley | 701/123 |
| 2010/0036601 | A1 | | 2/2010 | Ozawa et al. | |
| 2010/0148952 | A1 | * | 6/2010 | Barajas | 340/450.2 |
| 2011/0060521 | A1 | | 3/2011 | Watkins | |
| 2011/0309926 | A1 | | 12/2011 | Eikelenberg et al. | |
| 2012/0116670 | A1 | * | 5/2012 | Rosekrans | 701/426 |

FOREIGN PATENT DOCUMENTS

| DE | 102005016006 A1 | * | 10/2006 |
| JP | 2002-195843 | * | 7/2002 |
| JP | 2012-13672 | * | 1/2012 |
| WO | 2009/071369 A1 | | 6/2009 |

OTHER PUBLICATIONS

Int. Search Report cited in PCT Application No. PCT/US2013/024858 dated Jun. 3, 2013, 16 pgs.

* cited by examiner

*Primary Examiner* — Michael J Zanelli
(74) *Attorney, Agent, or Firm* — Cooper Legal Group, LLC

(57) ABSTRACT

One or more techniques and/or systems are provided for determining whether a vehicle comprises a sufficient amount of fuel to reach a destination. Making such a determination may comprise, among other things, estimating an amount of fuel required to reach the destination and/or estimating a rate of consumption along a travel route. Such estimates may be based upon factors external to the vehicle, including, among other things, topology of the travel route, current and/or predicted traffic patterns along the travel route, and/or driving habits of a user or others whom have navigated a similar route (or at least a portion of the route). When it is determined that the vehicle comprises an insufficient amount of fuel, a refueling notice indicative of the determination may be provided. In one embodiment, such a refueling may also suggest possible refueling stations along the travel route.

20 Claims, 6 Drawing Sheets

FUEL CONSUMPTION CALCULATIONS AND WARNINGS

BACKGROUND

Today, many cars are equipped with a computer system configured to measure various metrics and to provide those metrics to a user via a simple user interface. For example, the computer system may be configured to measure the pressure in respective tires of the vehicle, to estimate a fuel range (e.g., miles remaining on a tank of fuel), and/or to estimate fuel efficiency. These estimates and/or measurements may be displayed on the dashboard, providing the user with tools for evaluating car performance and/or maintenance, for example.

While these measurements and/or estimates are useful, they are often inaccurate. For example, estimating a fuel range may be a function of numerous factors, including driving habits, road conditions, terrain, type of driving (e.g., city or highway driving), etc. that are often not taken into consideration when estimating the fuel range. Thus, while displaying information about such estimates/metrics may provide a user with some guidance, a user should not rely on such information to determine whether s/he has enough to fuel travel the stated distance, to know whether the tires are properly inflated, etc. In fact, many such computer systems attempt to avoid such accurate information, particularly with respect to estimating fuel range. Instead, the computer system merely displays a "low fuel" notification when the estimated fuel range drops below a specified mileage (e.g., below 40 miles until empty) and/or when the amount of fuel drops below a specified threshold (e.g., $\frac{1}{8}^{th}$ of a tank).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, systems and/or techniques are described herein for determining whether a vehicle can arrive at a destination without refueling based upon considerations such as a current fuel level of the vehicle and a rate of consumption, or rather an expected rate of consumption, for example. The rate of consumption may take into consideration both factors internal to the vehicle and factors that are external to the vehicle. Internal factors are generally factors that can be determined at the time a vehicle is manufactured such as, among other things, curb weight, engine size, engine configurations, aerodynamics of vehicle, and/or other variables that can influence fuel consumption and that are known at the time of manufacturing. Conversely, external factors may comprise those factors that are dependent upon the environment. For example, external factors that may affect fuel consumption include, among other things, a gross weight of the vehicle, a driving style of a user of the vehicle, terrain (e.g., asphalt, dirt, gravel, etc.), topology of a travel route, traffic along the travel route, weather, etc. It will be appreciated that whereas internal factors are generally relatively static, external factors may vary greatly, even over a short span of time.

When it is determined that the vehicle cannot arrive at a destination without refueling (e.g., or cannot arrive at the destination without a specified amount of (reserve) fuel remaining), a notice may be provided indicative of such a determination. Such a notice may also provide suggestions on locations to refuel the vehicle. In one embodiment, locations may be sorted based upon, among other things, fuel prices at respective locations, geographic and/or temporal proximity relative to a travel route the vehicle takes to arrive at the destination, geographic and/or temporal proximity to a current location of the vehicle, etc., for example.

Moreover, in one embodiment, the determination of whether a vehicle can arrive at a destination without refueling may be periodically and/or continuously reevaluated. By way of example, suppose the vehicle is to be driven to a destination 100 miles away and a travel route is identified from the vehicle's current location to the destination. Initially, it may be determined that the vehicle comprises a sufficient amount of fuel to reach the destination given the traffic and/or weather conditions of the traffic route at that time. However, while in route to the destination, an accident may occur along the travel route, causing traffic delays that may be predicted to slow down the vehicle's progress and/or may force the vehicle to alter its route. Given the changed condition, the system may reevaluate whether the vehicle has a sufficient amount of fuel to reach the destination and may provide a refueling notice if it is determined that, given the changed condition, the vehicle does not have a sufficient amount of fuel to reach the destination. In this way, initial determinations may be reevaluated as external factors (e.g., traffic, weather, etc.) change relative to their respective conditions at a time when the initial determinations were made, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
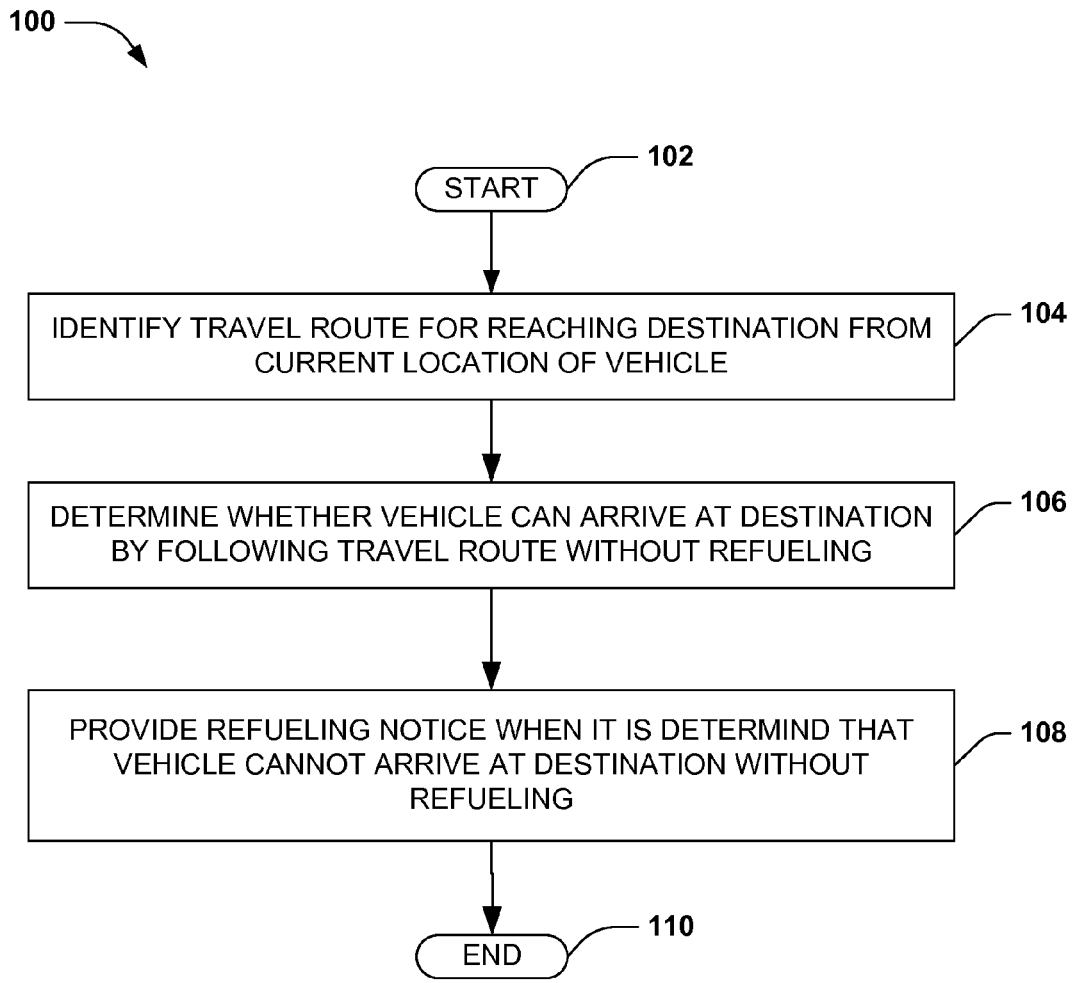
FIG. 1 is an exemplary method for providing a refueling notice.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, many vehicles and mobile devices (e.g., mobile phones, tablets, laptops, etc.) are equipped to detect their location through the inclusion of a global positioning system (GPS) receiver and/or other receiver configured to detect other signals from which a location can be derived. In this way, vehicles and/or mobile devices can provide location-based services that mediate the interaction of users with physical locations. For example, vehicles and/or mobile devices may store or be configured to retrieve detailed travel maps of a locale, and may use a detected location to display the vehicle's and/or mobile device's current location or to compute travel routes to intended destinations. For example, such services may provide a user with information about and/or directions to shops, restaurants, and/or entertainment venues of interest within a given area.

The techniques and/or systems described herein for configured to utilize this location information, along with information supplied by a vehicle, to determine whether a vehicle comprises sufficient fuel to reach an intended destination. By way of example, a destination may be selected on the mobile device and/or vehicle (e.g., by a user) and a travel route may be generated to guide the vehicle, or an operator of the vehicle, to the destination. To determine whether the vehicle comprises sufficient fuel to reach the selected destination, information about the travel route (e.g., such as traffic conditions, weather, topology, etc.) and information about the vehicle (e.g., such as current fuel level) may be collected and/or predicted. When a determination is made that the vehicle comprises an insufficient amount of fuel to reach the destination, a refueling notice may be provided and/or a list of possible refueling stations geographically and/or temporally proximate the travel route may be provided, for example.

FIG. 1 illustrates an example method 100 for providing a refueling notice. More particularly, FIG. 1 illustrates an example method 100 for determining whether a vehicle can arrive at a destination without refueling and for providing a refueling notice when it is determined that the vehicle cannot arrive at the destination without refueling (or cannot arrive at the destination without tapping into an allotted fuel reserve).

The example method 100 begins at 102, and a travel route for reaching the destination is identified at 104. Generally, the travel route begins at a current location of a vehicle and ends at the destination, although the travel route may begin at a location other than the current location of the vehicle and may end at a location other than the destination (e.g., where the destination is merely one stop along the travel route). For example, the user may specify a beginning point of the travel route and/or may specify that the travel route is to begin at the current location of the vehicle.

Those of skill in the art will appreciate that often times there are numerous routes that may be devised to get a user/vehicle from point A to point B, and thus guidelines/rules may be utilized to determine which route to ultimately select/identify. For example, the identified route may be the shortest route, the fastest route, a scenic route, a route that avoids toll roads, etc. Moreover, the user may be presented with several different possible routes and may be given the option of selecting from the possible routes and/or devising a route that was not presented. In this way, the travel route identified at 104 may be identified automatically based upon (user) specified/default criteria and/or may be identified/created by the user, for example.

Further, the destination of the travel route may be selected by a user and/or may be predicted based upon historical information, current time-of-day, calendar entries in a calendar associated with the user, and/or other information from which a destination can be predicted/devised. By way of example, in one embodiment, a user can perform a search for grocery stores within a specified geographic region on a location-enabled device (e.g., mobile device and/or vehicle) and select one of the search results as the destination (e.g., causing a travel route to be generated from the current location of the user/vehicle to the selected grocery store). In another embodiment, the travel route may be based upon historical information about a user/operator of the vehicle and a time of day. For example, at approximately 5 pm every Monday-Friday, a user may leave work and travel home. Therefore, if the user gets into his/her vehicle at about 5 pm on a Tuesday, it may be predicted that the user is intending to drive home. As such, a travel route may be identified that navigates the user from his/her workplace to home. Similarly, if a calendar associated with the user comprises an entry for a hair appointment at 7 pm, it may be surmised that the user is headed to his/her hair appointment if it is approaching 7 pm. Therefore, a hair studio/barbershop where the user typically gets his/her haircut may be automatically selected as the destination (e.g., and a travel route thereto may be identified). In this way, the destination may predicted based upon, among other things, historical information relating to the user and/or calendar information pertaining to activities of a user or may be selected/specified by a user, for example.

The example method 100 further comprises, at 106, determining whether the vehicle can arrive at the destination by following the identified travel route without refueling. Such a determination is typically based upon a current fuel level of the vehicle, a predicted/estimated rate of consumption of the vehicle for the travel route, and/or an estimated amount of fuel required for completing the travel route.

It will be appreciated that there are numerous techniques for determining the current fuel level of the vehicle. One of the more basic ways to determine the fuel level may be to place one or more fuel measuring sensors inside and/or spatially approximate a fuel reservoir. Measurements made by the sensors may be relayed to an onboard computer system, for example, configured to process the data and/or to transmit the data to a device making the determination at 106 (e.g., an onboard computer system of the vehicle and/or a mobile device operably coupled to the vehicle, such as through Bluetooth technology, for example). Another approach to determining the current fuel level may be to estimate it based upon the miles driven from the last refueling, for example. It will be appreciated that these examples describe merely some of the ways in which a current fuel level of the vehicle may be determined/estimated, and the instant disclosure, including the scope of the claims, is not intended to be limited to such examples.

It will also be appreciated that as used herein, fuel is intended to be interpreted broadly to describe any form of energy that may be used to power a vehicle. For example, fuel may comprise tradition sources for powering a vehicle, such as gasoline and/or diesel, and/or may comprise less conventional sources of power, such as electric, hydrogen, etc. Thus, the term fuel is not intended to be interpreted in a narrow sense to necessarily describe a particular source/form of power.

The predicted/estimated rate of consumption of the vehicle and/or the estimated amount of fuel needed to complete the travel route may be a function of factors internal to the vehicle and/or external to the vehicle. As described in the summary, internal factors are generally factors that can be determined at the time a vehicle is manufactured such as, among other things, the curb weight, engine size, engine configurations, aerodynamics of vehicle, and/or other variables that can influence fuel consumption and known at the time of manufacturing. Whereas, external factors may comprise those factors that are dependent upon the environment/application. For example, external factors that may affect fuel consumption include, among other things, the gross weight of the vehicle, a historical and/or predicted driving style of a user of the vehicle, terrain of the travel route (e.g., asphalt, dirt, gravel, etc.), topology of a travel route, known and/or predicted traffic conditions along the travel route, weather along the travel route, a driving style of one or more other uses traveling along at least a portion of the travel route, etc.

As an example, suppose a user intends to travel to a destination 100 miles away. If the travel route to the destination is mostly flat and/or downhill, it may be predicted/estimated that the vehicle is going to consume less fuel (e.g., and have a lower rate of consumption (e.g., 20 mpg) than if the travel route is mountainous (e.g., where the vehicle may have a higher rate of consumption (e.g., 15 mpg)). Thus, the amount of fuel expended to reach the destination 100 miles away may be significantly more if the travel route is mountainous than if it is flat. As such, the topology of the travel route may have a significant impact on the rate of consumption for the travel route and may impact whether a given amount of fuel is sufficient to reach the destination.

It will be appreciated that this information about the topology of the travel route, information pertaining to one or more of the internal factors, and/or information pertaining to other external factors (e.g., listed above) may be derived from a plurality of different sources. As an example, the internal factors may come from a computing system embedded in the vehicle, from data sources that comprise vehicle information, from one or more services external to the vehicle, and/or from a user of the vehicle. By way of example, a user may input the make and model of the vehicle into a mobile device making the determination, and vehicle information pertaining to that vehicle may be retrieved from a plurality of databases comprising information about the vehicle (e.g., such as average fuel ratings, engine type, weight, etc.).

Similarly, the external factors may come from a computing system embedded in the vehicle, one or more data sources external to the vehicle, and/or one or more services external to the vehicle. By way of example, a computing system embedded in the vehicle may provide historical information about the driving habits of a user (e.g., such as whether the user typically accelerates quickly or slowly) and/or may provide a prediction about the user's expected driving habits on the travel route given the historical information about the user's driving habits. Information about other external factors may come from sources remote from the vehicle. For example, current traffic conditions along a travel route and/or predicted traffic conditions for a particular road along the travel route at a time the vehicle is expected to be traversing the road may be acquired from a traffic monitoring service. Similarly, information about the driving habits of other users that traverse one or more roads along the travel route (e.g., whether they tend to drive over the speed limit, brake hard, accelerate rapidly, etc.) may be acquired from a service configured to monitor such information, for example.

Thus, information used to determine whether the vehicle can arrive at the destination by following the travel route without refueling may come from a plurality of sources including sources embedded in the vehicle and/or sources external to the vehicle.

At 108 in the example method 100, a refueling notice is provided when it is determined that the vehicle cannot arrive at the destination without refueling. It will be appreciated that, in one embodiment, this refueling notice is not a function of how much fuel is remaining in the vehicle. Rather, the refueling notice is a function of whether it is determined/estimated at 106 that the vehicle has enough fuel to reach the destination. For example, the vehicle may comprise ½ a tank of gas when the determination is made and the refueling notice is provided, if it is determined at 106 that the ½ tank of gas is insufficient to reach the destination.

The refueling notice is generally intended to provide the user with notice that s/he should plan to stop for fuel along the travel route and may provide additional information suggesting where to stop. For example, the refueling notice may specify where along the travel route the vehicle is expected to run out of fuel and/or may provide for display information about one or more refueling stations that the user may desire to stop at to refuel the vehicle. As an example, upon determining that the vehicle cannot arrive at the destination without refueling, a search may be performed to identify one or more refueling stations geographically proximate and/or temporally proximate to the travel route that the user could arrive at before the fuel currently comprised in the vehicle runs out (e.g., before the vehicle would have to be refueled). Results of the search may be provided to a user and/or to a mobile device providing the refueling notice for display to the user. In this way, the user may be provided options for refueling stations when it is determined that the vehicle will run out of run (e.g., or dip into a reserve fuel) before reaching the destination, for example.

The example method 100 ends at 110.

It will be appreciated that while the example method describes determining a travel route to a destination before determining whether a vehicle has sufficient fuel to reach the vehicle, identifying a travel route to the destination may be an iterative process. For example, a first travel route to the destination (e.g., a fastest route) may be identified and a determination may be made whether the vehicle has a sufficient amount of fuel to reach the destination given the first travel route. If it is determined that the vehicle does not comprise enough fuel, a second travel route to the destination (e.g., a next fastest route) may be identified, and a determination may be made whether the vehicle has a sufficient amount of fuel to reach the destination given the second travel route. Such a process may be repeated until a travel route is identified that would not require refueling and/or until a decision is made to stop searching for such a travel route. In this way, a preferred travel route may be identified as a function of a fuel level of the vehicle, for example.

Figure 2:
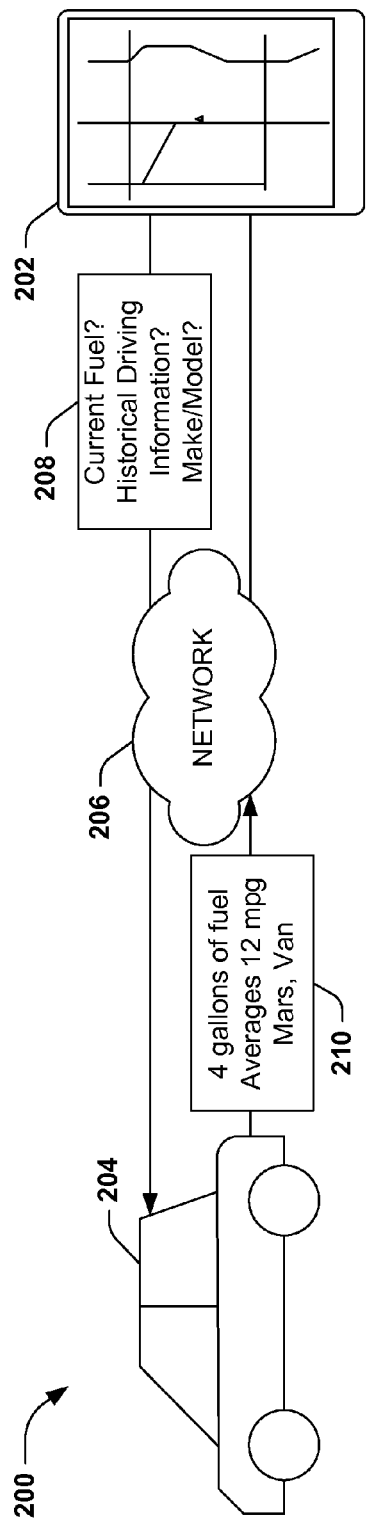
FIG. 2 is an illustration of an exemplary scenario where a vehicle may provide vehicle data, such as a current fuel level, to a mobile device.

FIG. 2 illustrates an example environment 200 for providing notice to a user when it is estimated that a vehicle cannot reach a destination without refueling. More particularly, FIG. 2 illustrates a mobile device 202 (e.g., smartphone, navigation system, tablet, etc.) comprising an application configured to determine a current location of a vehicle 204, display an identified travel route to a destination, and/or display a refueling notice, such as the refueling notice described with respect to the example method 100 of FIG. 1, when it is determined that the vehicle 204 cannot arrive at the destination without refueling.

In the example embodiment, the mobile device 202 is operably coupled to the vehicle 204 via a network interface 206, such as via a Bluetooth connection or other wireless protocol and/or via a USB connection or other wired connection. Moreover, it will be appreciated that while the example mobile device 202 is decoupled from the vehicle, in another embodiment, the mobile device 202 may be embedded in the vehicle. For example, the mobile device 202 may be an embedded electronic system such as part of a navigation system comprised in the vehicle 204.

In this example, presume that a destination has already been previously selected/predicted and a travel route has been identified. For example, the user may have specified the destination via an application on his/her mobile device 202 and the application (or a service linked thereto) may have identified a travel route for navigating the user from his/her current location (e.g., and the current location of the vehicle 204) to the destination.

Upon such an identification, as described with respect to the example method 100, the mobile device 202 and/or application operating thereon, for example, may be configured to determine whether the vehicle 204 has a sufficient amount of gas to reach the destination. As part of such a determination, the mobile device 202 may transmit to the vehicle, via the network 206, a query 208 (e.g., set of questions) and await a response from the vehicle 204. Such a query 208 may request information that is readily measured/recorded by the vehicle 208 (e.g., and that is difficult to derive elsewhere and/or less accurate to derive elsewhere). For example, the illustrated query 208 request information from the vehicle pertaining to a current fuel level of the vehicle 204, historical driving information about the user, and a make/model of the vehicle 204.

In response to the query, the vehicle 204 may transmit to the mobile device 202, via the network 206, a set of responses 210 that provide the requested information. For example, in the illustrated environment 200 the vehicle 204 responds to the query 208 by noting that the vehicle comprises 4 gallons of fuel, that the user averages 12 mpg, and that the vehicle is a Mars Van. It will be appreciated that based upon such information (e.g., along with information about the identified travel route, such as mileage, terrain, type of driving, etc. (e.g., which will be further described with respect to FIG. 3)), a determination may be made regarding whether the vehicle has and/or is expected to have a sufficient amount of fuel to reach the destination.

Figure 3:
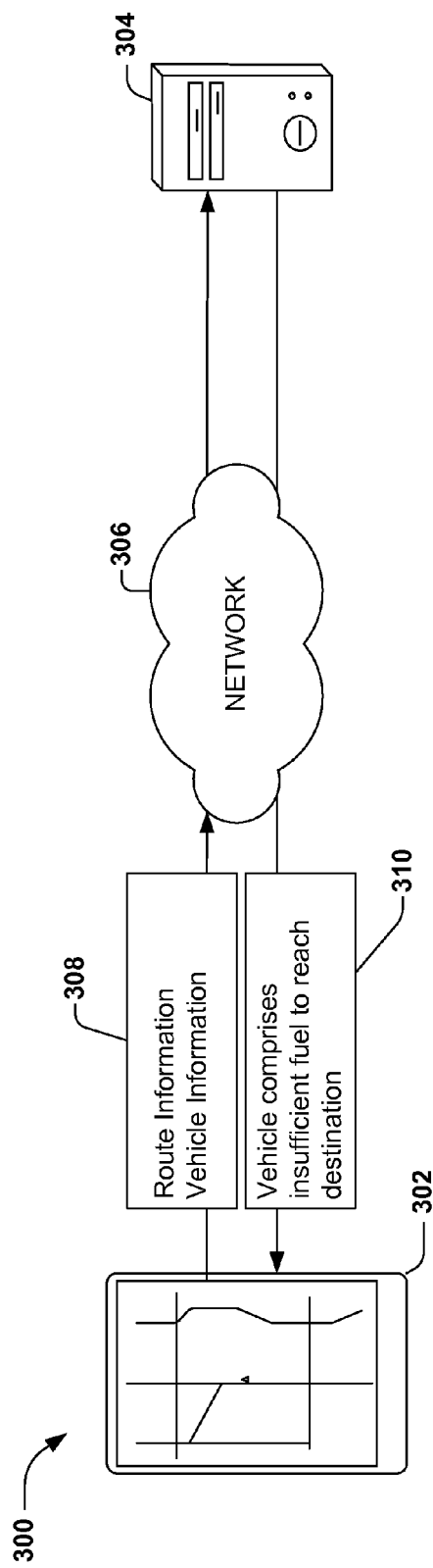
FIG. 3 is an illustration of an exemplary scenario where a mobile device may provide a remote computing system with information that may assist the remote computing system in determining whether a vehicle comprises a sufficient amount of fuel to reach a destination.

FIG. 3 illustrates an example environment 300 for determining/estimating whether a vehicle has a sufficient amount of fuel to reach a destination without refueling. More particularly, FIG. 3 illustrates an example embodiment where a mobile device 302 (e.g., 202 in FIG. 2) (e.g., a device configured to display the travel route and/or refueling notice) is in operable communication with one or more remote computing systems 304 configured to determine whether a vehicle (e.g., 204 in FIG. 2) has sufficient fuel to reach the destination given, among other things, the current fuel level of the vehicle, information about the travel route to the destination, and/or information about a user of the vehicle.

In the illustrated environment 300, a remote computing system 304 is configured to make the determination (e.g., 106 in FIG. 1) regarding whether a vehicle comprises a sufficient amount of fuel to reach a destination without refueling based at least in part upon information provided by the mobile device 302 via a network 306 (e.g., such as via the internet). By way of example, in the illustrated embodiment, upon receiving requested information from a vehicle, the mobile device 300 may construct a request for a determination regarding refueling from the remote computing system 304. Such a request 308 may comprise, among other things, route information, such as the identified route, and/or vehicle information (e.g., such as the vehicle information 210 provided to the mobile device 202 in FIG. 2).

Using the information comprised in the request 308, along with information from other sources, the remote computing system 304 may be configured to determine whether the vehicle comprises a sufficient amount of fuel to reach the destination. For example, in one embodiment, the remote computing system 304 may be configured to determine current traffic patterns and/or predicted traffic patterns along the travel route (e.g., which may affect fuel consumption), to determine weather conditions along the travel route, and/or to determine the topology of the travel route using information from other sources and to combine such information with information provided by the vehicle to make a determination regarding whether refueling is necessary.

After consideration of the information provided by the mobile device 300 via the request 308 and/or information provided by other sources (e.g., such as traffic monitoring services), the remote computing device 304 may make a determination regarding refueling and may provide a refueling notice 310 to the mobile device 300 (e.g., for display thereon) when it is determined that the vehicle comprises an insufficient amount of fuel to reach the destination. It will be appreciated that in one embodiment, the remote computing system 304 may return a response to the request 308 regardless of the determination. Moreover, as described above, the refueling notice may comprise more than just a simple notice. For example, it may comprise a list of suggested fuel stations given the current location of the vehicle, the travel route, etc.

Moreover, it will be appreciated that the example environment 300 merely describes one environment for making the determination (e.g., at 106 in the example environment) and is not intended to be limited as such to the extent practical. For example, in another embodiment, the mobile device 302 may merely provide to the remote computing system 304 information about a current location and a desired destination, and the remote computing system 304 may identify a travel route for reaching the destination and/or may calculate an amount of fuel required to reach the destination given more limited knowledge of the vehicle (e.g., such as make/model of the vehicle, but not current fuel level). In such an embodiment, the remote computing system 304 may provide to the mobile device 302 the identified travel route and an estimated amount of fuel required to reach the destination. The mobile device 302 may thus be configured to compare the estimate to a current fuel level of the vehicle to determine whether the vehicle can arrive at the destination without refueling.

In yet another embodiment, information necessary to calculate an estimated rate of consumption/estimated amount of fuel required for the travel route may be acquired by the mobile device 300 without the aid of a remote computing system 304, for example. For example, the mobile device 300 may comprise topology information about roads and/or may be operably coupled to a service configured to provide traffic information about roads. In this way, the mobile device 300 may communicate with other devices while estimating a rate of consumption for the travel route and/or estimating whether a vehicle comprises a sufficient amount of fuel to reach the destination given its current fuel level, but may not utilize a remote computing system 304 to make calculations regarding the rate of consumption and/or the amount of fuel necessary, for example.

Figure 4:
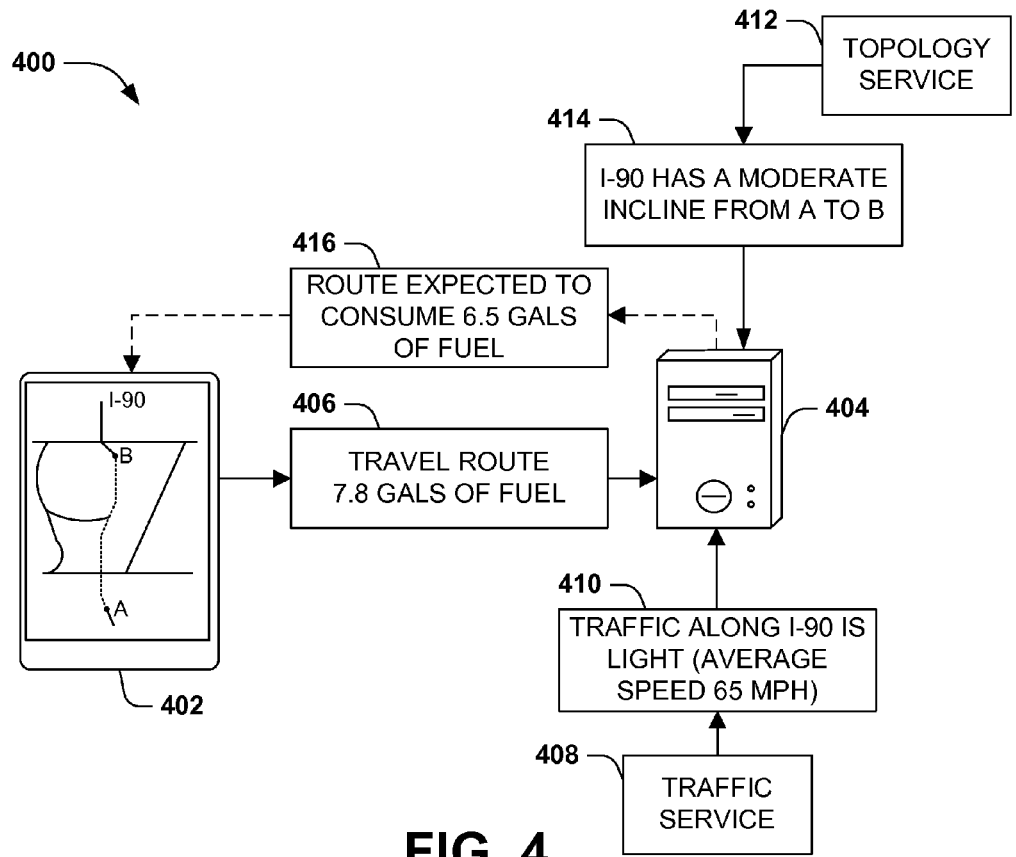
FIG. 4 is an illustration of an exemplary scenario where a mobile device may provide a remote computing system with information that may assist the remote computing system in determining whether a vehicle comprises a sufficient amount of fuel to reach a destination.
Figure 5:
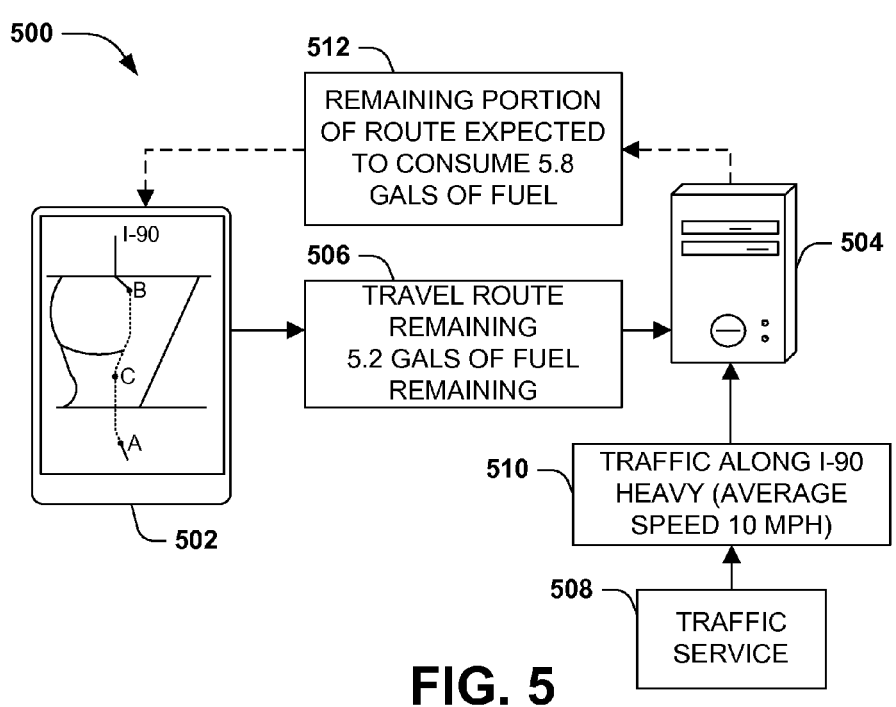
FIG. 5 is an illustration of an exemplary scenario where a mobile device may provide a remote computing system with information that may assist the remote computing system in determining whether a vehicle comprises a sufficient amount of fuel to reach a destination.

FIGS. 4-5 describe an example embodiment where a change in the traffic pattern along the route, after an initial determination regarding whether a vehicle could arrive at the destination without refueling, changes the outcome of the initial determination. More particularly, FIG. 4 illustrates an example environment 400 describing conditions that may be present when it is initially determined whether a vehicle (e.g., located at point A on the mobile device 402) comprises a sufficient amount of fuel to reach the destination (e.g., located at point B on the mobile device 402). FIG. 5 illustrates an example environment 500 describing how changed conditions may affect the initial determination and how an update may be provided to a mobile device 502 (e.g., 402 in FIG. 4) indicative of the changed conditions (e.g., including whether the changed conditions affect the initial determination regarding refueling).

For example, beginning with FIG. 4 and as also described with respect to FIG. 2, the mobile device 402 may be configured to determine a travel route from a current location of the vehicle (e.g., or a specified beginning location) to a desired/predicted destination. For example, in the illustrated environment, the current location of the vehicle may be represented by point A on a map displayed on the mobile device and the destination may be represented by point B. The dashed line illustrates an identified travel route for arriving at point B from point A. Thus, in the illustrated embodiment, the user may reach the destination by traveling along I-90.

As further described with respect to FIG. 3, upon identification of a travel route and receipt of information about a current fuel level of the vehicle (e.g., when the vehicle is at the initial location A), the mobile device 402 may be configured to transmit a request 406 (e.g., 308 in FIG. 3) comprising at least some of said information to a remote computing system 404 (e.g., 304 in FIG. 3) configured to determine whether the vehicle comprises a sufficient amount of fuel to reach the destination (e.g., point B) given the travel route. For example, in this embodiment, the mobile device 406 is configured to transmit with the request the identified travel route and the current fuel level of the vehicle, although as described above, the request may comprise other information.

The remote computing system 404 is configured to estimate an amount of fuel that the vehicle needs to reach the destination and/or determine whether the vehicle comprise a sufficient amount of fuel. For example, in the illustrated environment, the remote computing system 404 is operably coupled to a plurality of services configured to provide the remote computing system 404 with information that may assist the remote computing system 404 in estimating an amount of fuel required to complete the travel route and/or for determining whether the vehicle comprises a sufficient amount of fuel. By way of example, the remote computing system 404 is operably coupled to a traffic service 408 configured to provide the remote computing system 404 with traffic information regarding current traffic patterns along the travel route and/or predicted, future traffic patterns at a time when the vehicle is traversing the route. For example, the traffic service 408 may provide the remote computing system 404 with a notification 410 that provides that at the present time, traffic along I-90 between points A and B is light, with the average vehicle traveling at 65 mph.

The remote computing system 404 may also be operably coupled with a topology service 412 configured to provide the remote computing system 404 with information regarding the topology of the travel route. For example, in the illustrated environment 400, the topology service 412 may be configured to provide the remote computing system 404 with a notification 414 that indicates that I-90 has a moderate incline from A to B (e.g., which may cause the vehicle to consume more gas than if it was not sloped and/or sloping downward).

Using the information provided by the mobile device 402, the traffic service 408, and/or the topology service 412, the remote computing device 404 may determine that the vehicle is expected to consume 6.5 gallons of fuel and/or that the vehicle is expected to be able to arrive at the destination without needing to refuel (e.g., given that the mobile device 402 indicated that the vehicle comprised 7.8 gallons of fuel). Such a determination may be transmitted in the form of a response 416 to the mobile device 402. In this way, the remote computing device 404 may provide the mobile device 402 with information regarding its determination, for example.

FIG. 5 provides an example environment 500 illustrating how a change in the environment as a vehicle is traveling along a designed travel route may affect the determination initially made regarding fuel consumption (e.g., as described with respect to FIG. 4). For example, as described with respect to FIG. 4, a travel route may be represented by a dashed line (e.g., where point A represents the starting point and point B represents the destination). Point C on the mobile device 502 (e.g., 402 in FIG. 4) may represent the present location of the vehicle.

In one embodiment, the mobile device 502 is configured to periodically contact a remote computing system (e.g., 504 in FIG. 5) and check-in (e.g., providing the remote computing system with the remaining amount of fuel and/or current location along the travel route). For example, in the illustrated environment, the mobile device 406 provides to the remote computing system an update 506 describing where the vehicle is located along the travel route and providing an indication that 5.2 gallons of fuel remains in the vehicle.

The remote computing system 504 may also be configured to receive traffic updates from a traffic service 508 (e.g., 408 in FIG. 4) describing changes in conditions along the travel route. For example, in the illustrated environment, the traffic service 408 may provide a notice 510 indicating that traffic along I-90 has increased substantially (e.g., due to an accident ahead) relative to traffic during an initial check (e.g., as described in FIG. 4). The remote computing system 504 may recognize this change and recalculate the amount of fuel the vehicle is expected to consume from its current location to the destination given the change in traffic pattern and may provide a refueling notice to the mobile device if a determination is made that the vehicle no longer comprises a sufficient amount of fuel to complete the journey. For example, in the illustrated environment 500, the remote computing device 504 provides notice 512 indicating the due to the change in traffic patterns, the remote computing service expects the vehicle to run out of fuel before reaching the destination.

It will be appreciated that in one embodiment, such a notice may also comprise one or more suggestions on where a user can stop to refuel the vehicle. For example, the notice may identify refueling stations proximate the travel route and within a distance the vehicle is capable of reaching without running out of fuel. In one embodiment, such refueling stations may be filtered/sorted according to gas prices at respective refueling stations, temporal and/or spatial proximity to the travel route, temporal and/or spatial proximity to a current location of the vehicle, etc., etc.

It will also be appreciated that FIG. 5 illustrates merely a simplistic example of how the determination regarding refueling may change as a function of changes to external factors (e.g., traffic patterns, weather conditions, user's driving habits, driving habits of others along the travel route, etc.). For example, in another embodiment, upon detection in a change in the traffic pattern along the route, the remote computing device may recalculate routes to determine a best (e.g., fastest) route for the user to take and may recalculate whether the vehicle comprises sufficient fuel to reach the destination given the new/update route (e.g., after topology and/or traffic considerations of the new/updated route are taken into account).

Figure 6:
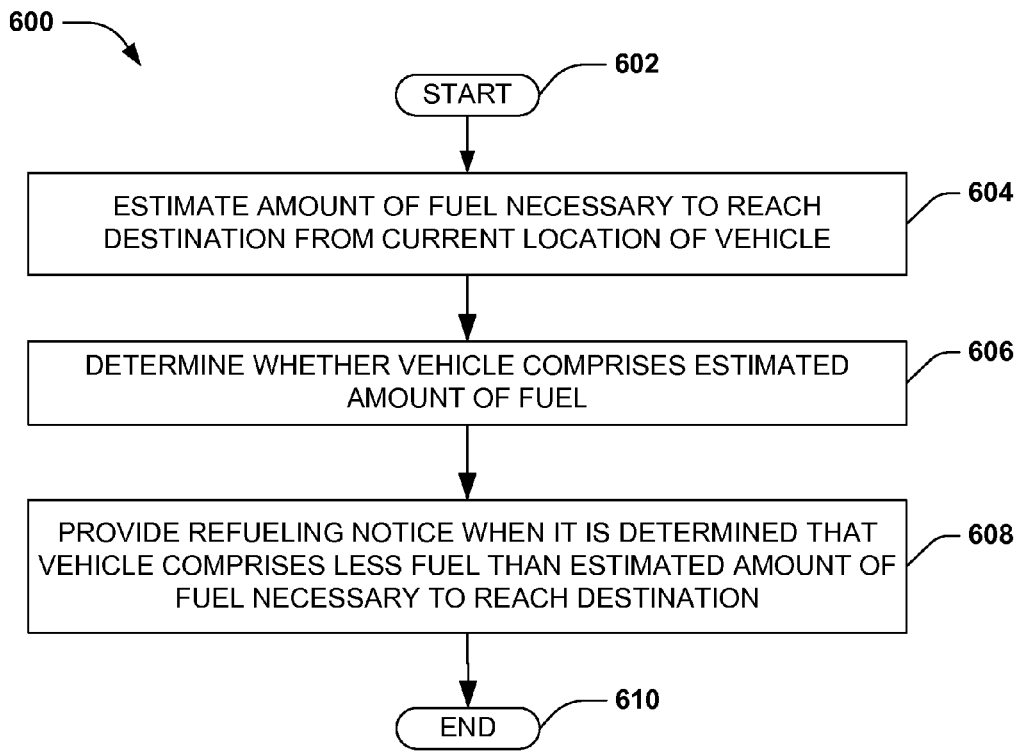
FIG. 6 is an exemplary method for providing a refueling notice.

FIG. 6 illustrates yet another exemplary method 600 for providing a refueling notification or notice when it is determined a vehicle cannot reach its destination without refueling.

The example method 600 begins at 602 and an amount of fuel necessary to reach a destination from a current location of a vehicle is estimated at 604. Stated differently, a travel route is identified as described above and one or more estimates are made regarding how much fuel it will take for a given vehicle to reach the destination. Such estimates may take into account internal factors related to the vehicle and/or external factors related to, among other things, the user of the vehicle and/or the travel route. For example, internal factors may comprise information about the vehicle including, but not limited to, aerodynamics, engine performance, curb weight, and/or fuel ratings (e.g., estimated consumption in the city and/or on the highway). External factors may include, among other things, known and/or predicted current and/or future traffic patterns along the travel route, topology of the travel route (e.g., mountainous, flat, downhill, etc.), historical and/or predicted driving style of the user operating the vehicle, and/or the driving style of one or more other users that travel on at least a portion of the route (e.g., such as whether other users, on average, tend to accelerate rapid, drive in excess of the speed limit, etc.). It will be appreciated that the listed internal and/or external factors are not intended to describe an exhaustive list. Rather, they are merely intended to provide some examples of factors that may be considered and that can influence fuel consumption of a vehicle.

At 606 in the example method 600, it is determined whether the vehicle comprises the estimated amount of fuel. That is, stated differently, the estimated amount of fuel is compared to the current fuel level of the vehicle to determine whether the vehicle comprises a sufficient amount of fuel to reach the destination. It will be appreciated that techniques for determined/predicting the amount of fuel a vehicle comprises are described above, and therefore, for purposes of brevity, are not being described here.

At 608 in the example method 600, a refueling notice is provided when it is determined that the vehicle comprises less fuel than the estimated amount of fuel necessary to teach the destination. In other words, a refueling notice is provided (e.g., for display to a user) when it is determined that the vehicle cannot arrive at the destination without refueling.

It will be appreciated that as described above, the notice may be as simple as an indication of the determination and/or may comprise other information that may be useful to the user. For example, the refueling notice may comprise one or more suggested locations for refueling arranged according to some criteria (e.g., fuel cost, proximity to user, proximity to travel route, etc.). In this way, when it is determined that the vehicle does not comprise enough fuel to reach the destination, the user may be provided with sufficient information to decide where to stop for fuel, for example.

Figure 7:
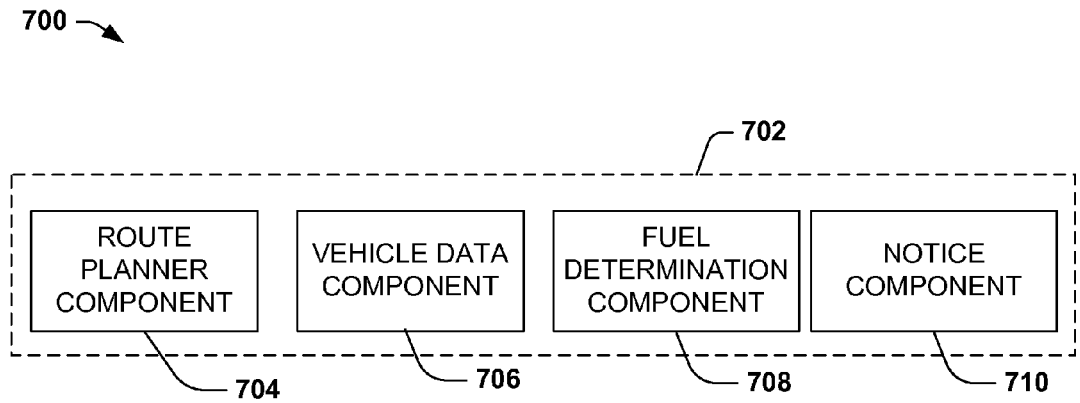
FIG. 7 is an exemplary system for providing a refueling notice

FIG. 7 illustrates an example environment 700 providing for a component block diagram of an example system 702 configured to calculate an amount of fuel to reach a destination and/or a rate of consumption for a travel route to the destination. It will be appreciated that the example system 702 described herein is merely intended to describe merely parts of a systems relevant to making such a determination, and the scope of the instant application, including the scope of the claims, is not intended to be limited as such. Moreover, it will be appreciated that such a system 700 may be embedded in a vehicle, located on a mobile device (e.g., 302 in FIG. 3), and/or located within a remote computing system (e.g., 304 in FIG. 3), for example.

As illustrated, the example system 702 comprises a route planner component 704 configured to identify a travel route for a vehicle. As described above, the travel route may begin at the current location of the vehicle or at a location designated by the user and may end a specified/predicted destination. For example, in one embodiment, the user may choose the beginning and/or ending locations of the travel route. In another embodiment, the beginning location may be designed as a current location of the vehicle (or mobile device sensing signals from which a location can be derived), and the destination can be predicted based upon, among other things, historical patterns of a user, time of day, and/or one or more entries comprised in a calendar associated with the user, for example. It will be appreciated that these are just a few of the many considerations that may be taken into account when planning a travel route and that other considerations known to those skilled in the art are also contemplated.

The example system 702 also comprises a vehicle data component 706 configured to receive data from the vehicle (e.g., or an embedded computer thereon). For example, as described above, the vehicle may monitor metrics, such as current fuel level, historical driving habits, tire inflation levels, and/or other information that may be readily determined from sensors embedded in the vehicle and/or calculated from information provided by sensors. At least some of this information collected by the vehicle and/or sensors thereon may be transmitted to the vehicle data component 706, for example.

It will be appreciated that as further detailed above, the system 702 may be embedded in the vehicle, may be a mobile device operably coupled to the vehicle, and/or may be a remote computing system. As such, how and/or from where the vehicle data component 706 receives the vehicle data may depend upon, among other things, where the system 702 is located. For example, where the vehicle data component 706 is embedded in the vehicle, the vehicle data component may receive information directly from sensors in the vehicle and/or from another computer system embedded in the vehicle. In another embodiment, where the vehicle data component 706 is comprised in a mobile device operably coupled to the vehicle, the vehicle data may be transmitted to the vehicle data component 706 from a computer system embedded in the vehicle. In yet another embodiment, where the system 702 is located in a remote computing system, the vehicle data component 706 may be configured to receive such information from the vehicle and/or from a mobile device operably coupled to the vehicle, for example. Thus, the vehicle data component 706 does not necessarily have to receive the data directly from the vehicle itself but rather may receive the data from an intermediary receiver of such data (e.g., such as a mobile device), for example.

The example system 702 also comprises a fuel determination component 708 configured to receive, among other things, the travel route information from the route planner component 704 and the vehicle data information from the vehicle data component 706. Using such information, along with other information that may be determined about the travel route, the user of the vehicle, etc., for example, the fuel determination component 708 may be configured to determine whether the vehicle comprises a sufficient amount of fuel to reach the destination via the travel route without refueling. By way of example, the fuel determination component 708 may be operably coupled with a traffic service configured to provide traffic updates/predictions regarding traffic conditions along the travel route, a weather service configured to provide weather information about the travel route, a topology service configured to provide information about a topology of the route, etc. Such information, as further detailed above, may be useful in making a determination regarding whether the vehicle comprises a sufficient amount of fuel. In this way, using information about the travel route, the fuel determination component 708 can estimate the amount of fuel required to make the trip and/or estimate rate of consumption for the trip, for example.

It will be appreciated that the fuel determination component 708 may also be configured to continuously and/or periodically refine/update an initial determination regarding whether the vehicle comprises a sufficient amount of fuel. For example, if a factor (e.g., such as traffic, weather, etc.) that was considered during an initial determination changes after the initial determination, the fuel determination component 708 may be configured to recalculate the estimated amount of fuel and/or the rate of consumption based upon the change (e.g., to further refine the determination given the increased/decreased traffic, for example).

The example system 702 further comprises a notice component 710 configured to provide a refueling notice when the fuel determination component 708 determines that the vehicle comprises an insufficient amount of fuel to reach the destination. Such a refueling notice is intended to provide an indication to the user that a refueling may be required along the travel route and may be displayed on a display embedded in the vehicle and/or on a mobile device associated with the user, for example.

Moreover, while not illustrated in the example system 702, in one embodiment, the system can also comprise a refueling station component configured to identify refueling stations that that the vehicle can arrive at before running out of fuel and/or that are in close geographic and/or temporal proximity to the travel route. Such a component may also be configured to sort the identified refueling stations according to some predetermined criteria (e.g., such as by fuel prices at respective stations, temporal proximity to route, temporal proximity to vehicle, etc.) and to provide the sorted results to the notice component 710. In this way, the notice component 710 can be configured to provide a refueling notice that further comprises suggestions on where a vehicle can stop to refuel without substantially deviating from the travel route, for example.

Figure 8:
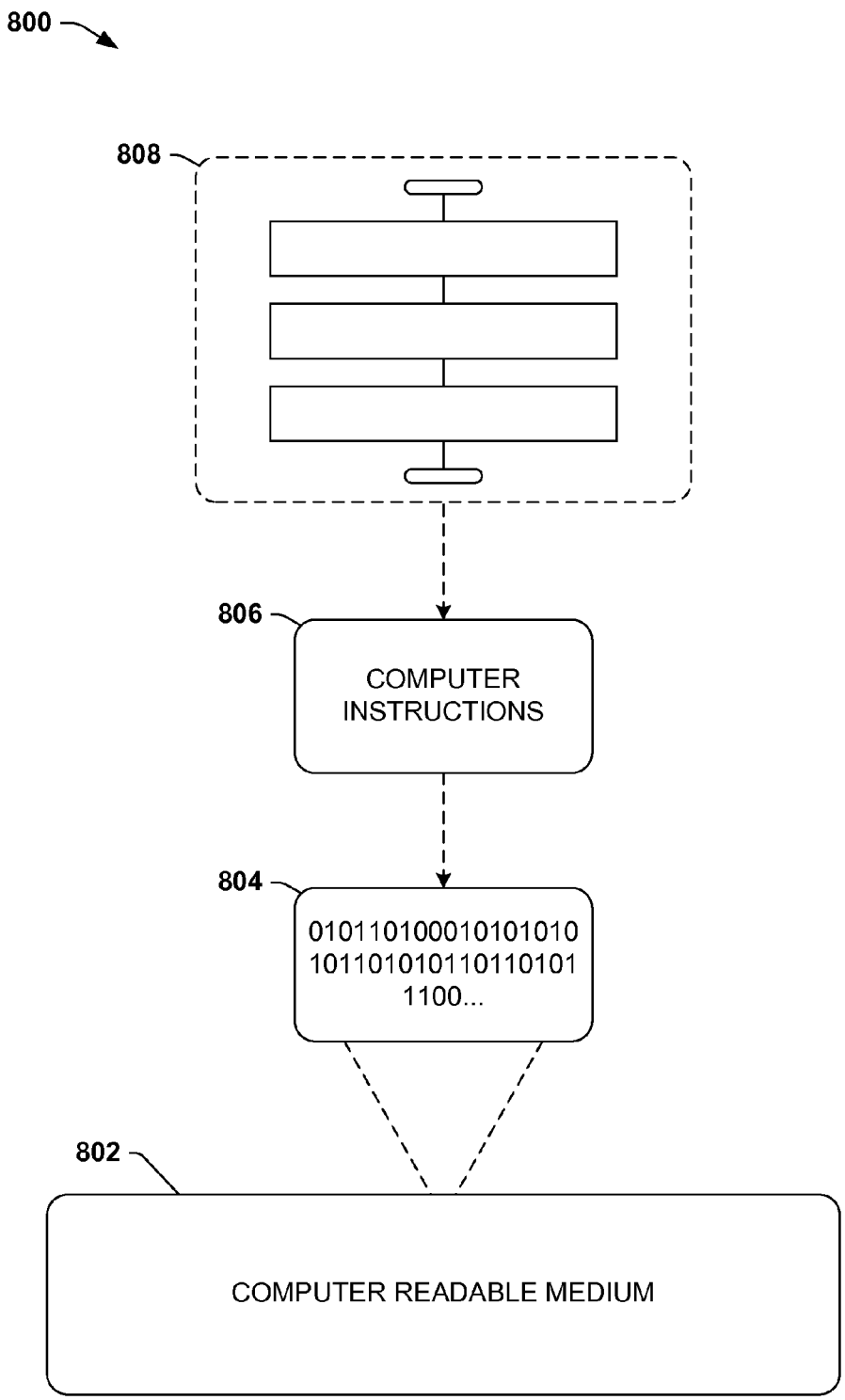
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 802 (e.g., a CD-R, DVD-R, or a platter of a hard disk drive), on which is encoded computer-readable data 804. This computer-readable data 804 in turn comprises a set of computer instructions 806 configured to operate according to one or more of the principles set forth herein. In one such embodiment 800, the processor-executable computer instructions 806 may be configured to perform a method 810, such as at least some of the exemplary method 100 of FIG. 1, and/or 600 of FIG. 6, for example. In another such embodiment, the processor-executable instructions 806 may be configured to implement a system, such as at least some of the exemplary system 700 of FIG. 7, for example. Many such computer-readable media 802 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
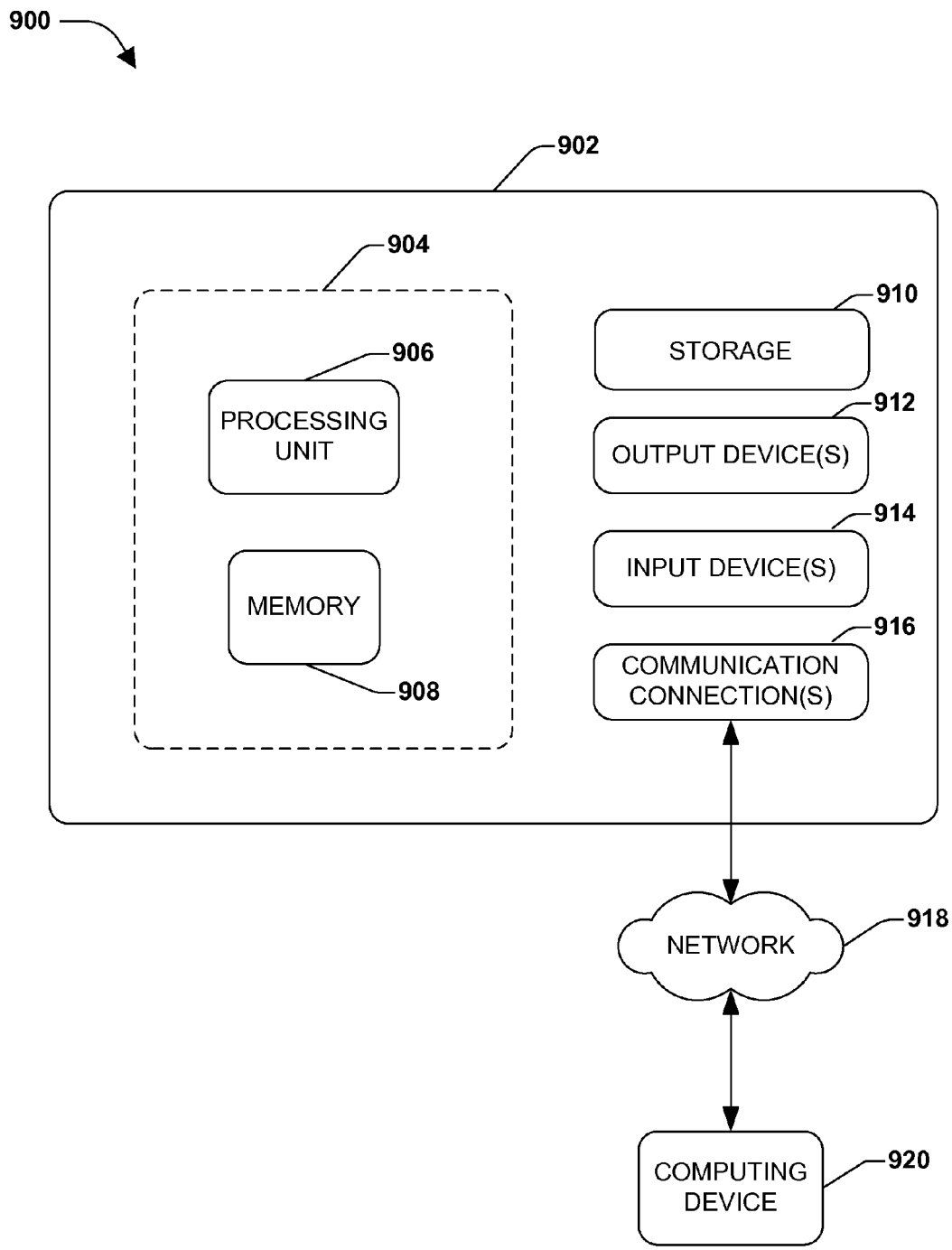
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 618 may be volatile (such as RAM, for example), non-volatile (such as ROM, flash memory, etc., for example), or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 6 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via a network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing a refueling notice, comprising:
identifying a travel route for a vehicle between a starting location and a destination;
identifying an incident along the travel route;
forecasting traffic along the travel route based at least in part upon a location of the incident;
determining whether the vehicle can arrive at the destination, via the travel route, without refueling, the determining based at least in part upon a current fuel level of the vehicle and an expected rate of fuel consumption for the travel route, the expected rate of fuel consumption based at least in part upon the forecasting; and
providing a refueling notice responsive to determining that the vehicle cannot arrive at the destination, via the travel route, without refueling.

2. The method of claim 1, comprising generating an updated travel route for arriving at the destination responsive to the determining that the vehicle cannot arrive at the destination, via the travel route, without refueling.

3. The method of claim 1, the identifying an incident, the forecasting, the determining whether the vehicle can arrive at the destination, and the providing occurring while the vehicle is in route to the destination via the travel route.

4. The method of claim 1, the expected rate of fuel consumption based at least in part upon a topology of the travel route.

5. The method of claim 1, the expected rate of fuel consumption based at least in part upon a historical driving style of a user operating the vehicle.

6. The method of claim 1, the expected rate of fuel consumption based at least in part upon a predicted driving style of a user operating the vehicle.

7. The method of claim 6, comprising predicting the predicted driving style of the user based at least in part upon a driving style of one or more other users traveling at least a portion of the travel route.

8. The method of claim 1, the identifying a travel route comprising identifying the travel route as a function of a current time of day.

9. The method of claim 1, comprising identifying a refueling station at least one of geographically proximate or temporally proximate the travel route responsive to the determining that the vehicle cannot arrive at the destination, via the travel route, without refueling.

10. The method of claim 9, the refueling notice comprising information about the refueling station.

11. The method of claim 9, the identifying a refueling station comprising:
identifying the refueling station as a refueling station that the vehicle can arrive at with a specified amount of fuel remaining in the vehicle.

12. The method of claim 9, comprising:
identifying a second refueling station at least one of geographically proximate or temporally proximate the travel route responsive to the determining that the vehicle cannot arrive at the destination, via the travel route, without refueling; and
ordering the refueling station relative to the second refueling station as a function of a first price of fuel at the refueling station and a second price of fuel at the second refueling station.

13. A system, comprising:
one or more processing units; and
memory comprising instructions that when executed by at least one of the one or more processing units perform a method, comprising:
identifying a travel route for a vehicle between a current location of the vehicle and a destination;
receiving data from the vehicle indicative of a current fuel level of the vehicle;
estimating a rate of fuel consumption of the vehicle for the travel route, the estimating comprising predicting a first speed of the vehicle along a portion of the travel route based at least in part upon a driving style of one or more other users traveling the portion of the travel route;
determining whether the vehicle comprises a sufficient amount of fuel to reach the destination, via the travel route, without refueling based at least in part upon the current fuel level of the vehicle and the rate of fuel consumption; and
providing a refueling notice responsive to determining that the vehicle comprises an insufficient amount of fuel to reach the destination, via the travel route, without refueling.

14. The system of claim 13, the identifying comprising identifying the travel route based at least in part upon current time of day.

15. The system of claim 13, the estimating comprising estimating the rate of fuel consumption based at least in part upon a topology of the travel route.

16. The system of claim 13, the estimating comprising estimating the rate of fuel consumption based at least in part upon a historical driving style of a user operating the vehicle.

17. The system of claim 13, comprising identifying a refueling station at least one of temporally proximate or geographically proximate the travel route responsive to the determining that the vehicle comprises an insufficient amount of fuel to reach the destination, via the travel route, without refueling.

18. The system of claim 17, the refueling notice comprising information about the refueling station.

19. The system of claim 17, comprising:
identifying a second refueling station at least one of temporally proximate or geographically proximate the travel route responsive to the determining that the vehicle comprises an insufficient amount of fuel to reach the destination, via the travel route, without refueling; and
ordering the refueling station relative to the second refueling station as a function of a first price of fuel at the refueling station relative to a second price of fuel at the second refueling station.

20. A non-transitory computer readable medium comprising instructions that when executed by one or more processing units perform a method, comprising:
identifying a travel route for a vehicle between a starting location and a destination;
identifying an incident along the travel route;
forecasting traffic along the travel route based at least in part upon a location of the incident;
determining whether the vehicle can arrive at the destination, via the travel route, without refueling, the determining based at least in part upon a current fuel level of the vehicle and an expected rate of fuel consumption for the travel route, the expected rate of fuel consumption based at least in part upon the forecasting; and
providing a refueling notice responsive to determining that the vehicle cannot arrive at the destination, via the travel route, without refueling.

* * * * *